Figure 1:
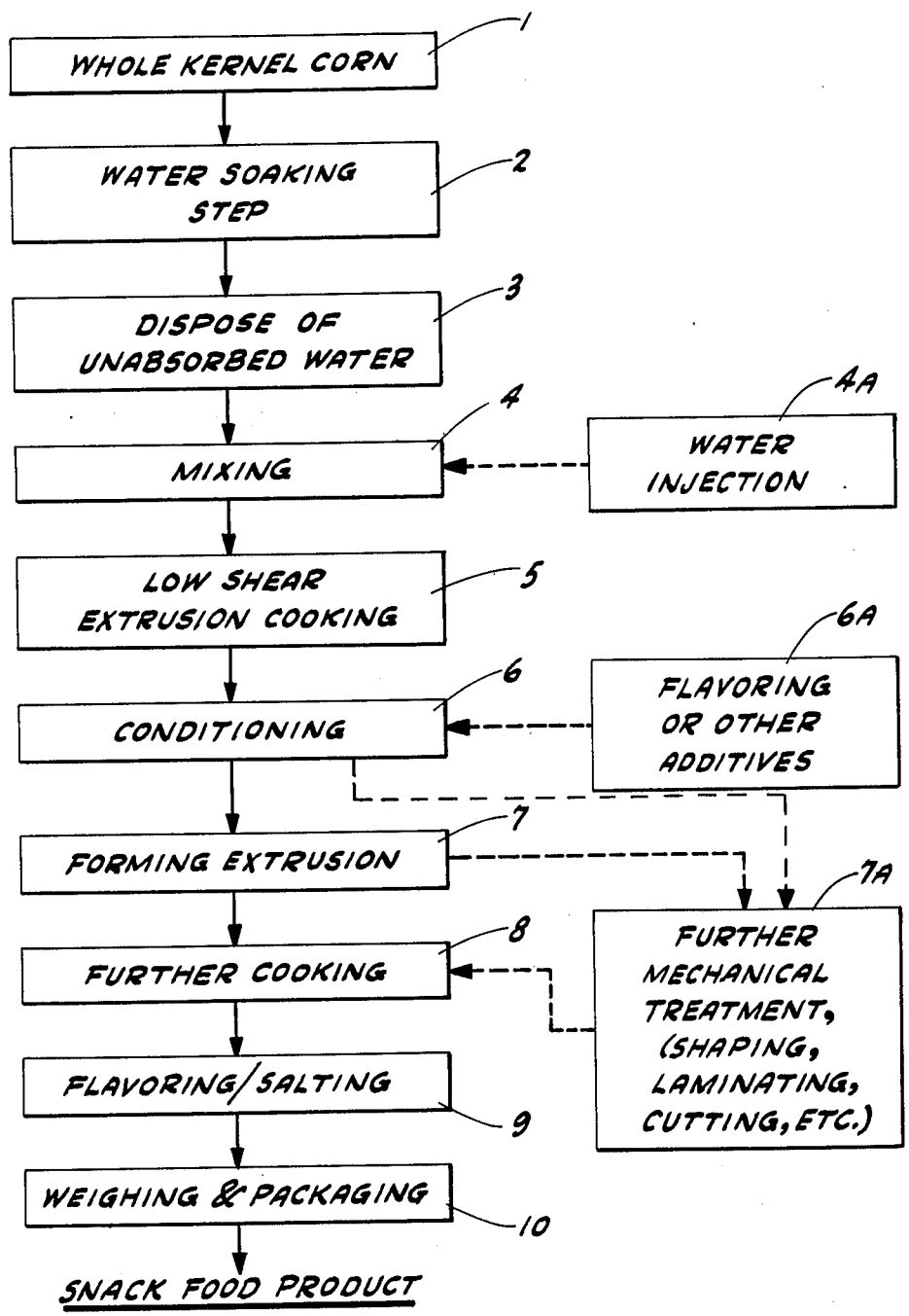

United States Patent [19]

Sadel, Jr. et al.

[11] Patent Number: 4,778,690
[45] Date of Patent: Oct. 18, 1988

[54] PROCESS CONTAINING A COOKING EXTRUSION STEP FOR FORMING A FOOD PRODUCT FROM A CEREAL

[75] Inventors: Stanley S. Sadel, Jr.; Valerio Sangiovanni, both of Lancaster, Pa.

[73] Assignee: Mapam, Inc., Lancaster, Pa.

[21] Appl. No.: 896,691

[22] Filed: Aug. 15, 1986

[51] Int. Cl.$^4$ .............................................. A23P 1/14
[52] U.S. Cl. ................................. 426/560; 426/448; 426/462; 426/808
[58] Field of Search ............... 426/438, 448, 441, 443, 426/446, 447, 498, 502, 504, 506, 507, 508, 516, 549, 560, 618, 619, 620, 452, 455, 456, 458, 459, 449, 450, 460, 461, 462, 463, 465, 466, 808

[56] References Cited

U.S. PATENT DOCUMENTS

| | | | |
|---|---|---|---|
| Re. 26,257 | 8/1967 | Altman | 99/80 |
| 1,446,200 | 2/1923 | Mulkey . | |
| 3,458,321 | 7/1969 | Reinhart et al. | 426/448 |
| 3,471,298 | 10/1969 | Hirahara | 99/2 |
| 3,528,815 | 5/1967 | Trotter | 99/2 |
| 3,579,352 | 5/1971 | Bookwalter et al. | 426/448 |
| 3,653,915 | 4/1972 | Rubio | 426/549 |
| 3,655,385 | 4/1972 | Rubio | 426/549 |
| 3,708,308 | 1/1973 | Bendenk et al. | 426/448 |
| 3,745,019 | 7/1973 | Huxoll et al. | 99/83 |
| 3,778,521 | 12/1973 | Fisher et al. | 99/80 PS |
| 3,800,050 | 3/1974 | Popel | 425/343 |
| 3,861,844 | 1/1975 | Miller | 425/207 |
| 3,890,454 | 6/1975 | Nijweide | 426/508 |
| 4,022,918 | 5/1977 | Miller | 426/446 |
| 4,241,106 | 12/1980 | Tims | 426/549 |
| 4,286,058 | 8/1981 | Wenger et al. | 426/508 |
| 4,325,976 | 4/1982 | Harrow et al. | 426/448 |
| 4,446,163 | 5/1984 | Galle et al. | 426/448 |
| 4,590,081 | 5/1986 | Sawada et al. | 426/448 |
| 4,608,261 | 8/1986 | MacKenzie | 426/446 |
| 4,645,679 | 2/1987 | Lee et al. | 426/560 |

OTHER PUBLICATIONS

Rossen and Miller, "Food Extrusion," Aug. 1973 Food Technology, pp. 46–53.
Mapimpianti, "Extrusion-Cooking and Extrusion-Forming Units", 1980, 4 page bulletin.
Harper, "Extrusion Processing of Food" Jul. 1978, Food Technology, pp. 67–72.
Smith, "Technical Aspects of Extrusion", Apr. 1979, Cereal Foods World, pp. 132–135; Bain, ibid, pp. 136–137; Horn, ibid, pp. 140–141, 144–145.
Harper, Extrusion of Foods, 1981, vol. I, pp. 127–142, vol. II, pp. 46–74.

Primary Examiner—Donald E. Czaja
Assistant Examiner—Carolyn Paden
Attorney, Agent, or Firm—Flehr, Hohbach, Test, Albritton & Herbert

[57] ABSTRACT

A snack food is prepared from whole kernel cereal, without milling, such as corn, rice or wheat and the like. By rehydrating the cereal to at least 25% moisture prior to low shear cooking extrusion to achieve about 75% gelatinization, then cooling and drying the material prior to extrusion into a selected form for further mechanical treatment or finish cooking and flavoring. When cooked in oil a lower fat product results.

11 Claims, 2 Drawing Sheets

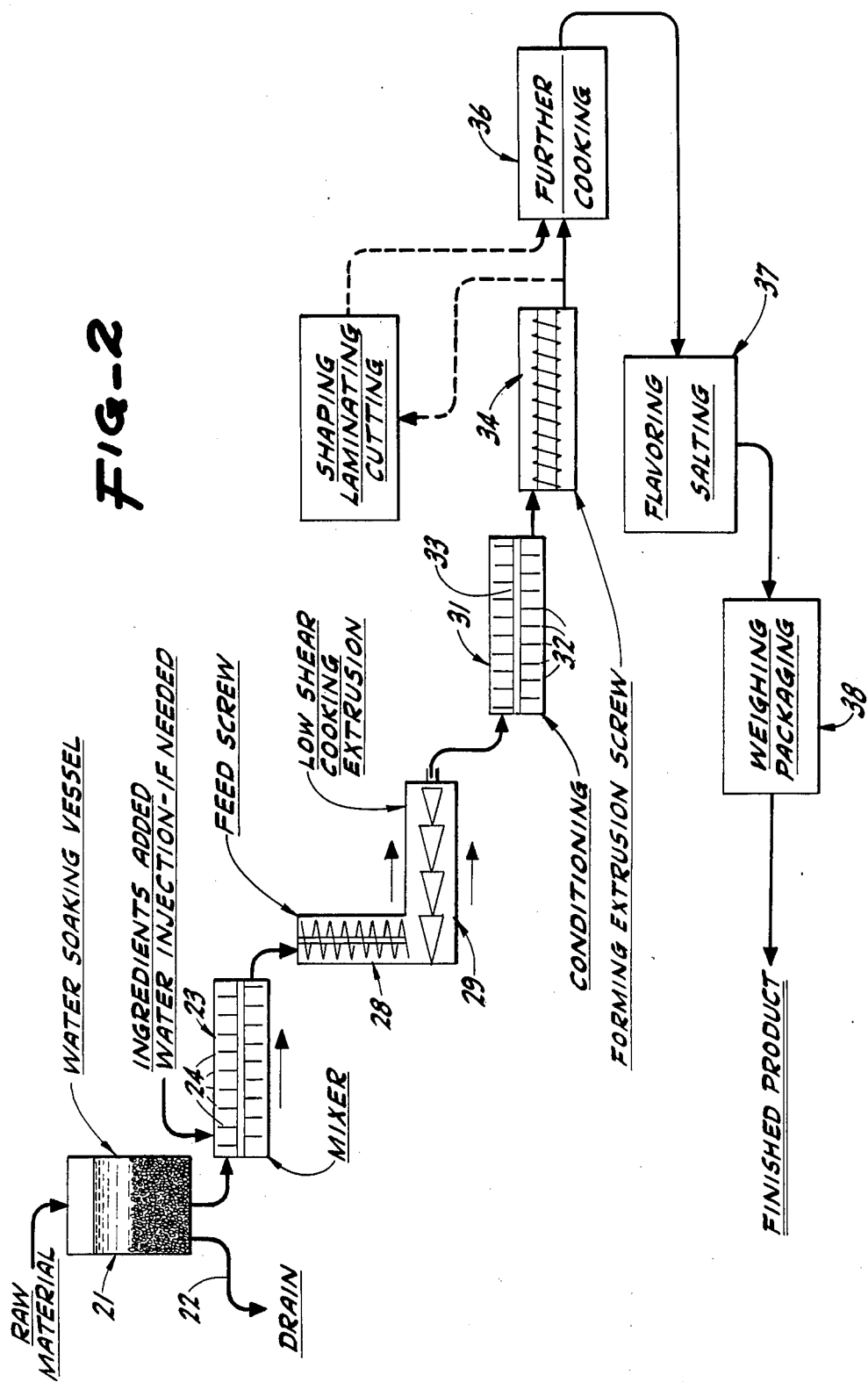

PROCESS CONTAINING A COOKING EXTRUSION STEP FOR FORMING A FOOD PRODUCT FROM A CEREAL

This invention relates to a process containing a cooking extrusion step for preparing a food product and more specifically concerns an improved process for preparing a snack food product or the like from whole kernel corn or other cereal.

A widely used conventional process for preparing tortillas and certain snack food products is to use corn as the starting material. An initial step in that process is to place milled or whole kernel corn into a kettle, add a supply of water and of lime. After dwelling in the simmering kettle for a period of 2 to 26 minutes at a temperature of 180° to 210° F.; and soaking in tanks for a period of 6 to 16 hours at 140° to 155° F., the lime water is drained from the material, the corn is washed removing a high percentage of the hull, then semi-cooked corn is ground into a masa. The masa is then rolled into a sheet, thereafter cut into the desired shape and finished cooked. Finish cooking may be achieved in a vat of hot oil or by toasting in an oven or combination thereof. At the end of the water cooking step it was found that the corn material was gelatinized in the conventional process to only 30–49%.

From an ecological standpoint it is highly desirable to eliminate the use of lime water and caustic in the preparation of corn products because of the serious problem in treating and disposing of the lime water or caustic in municipal and industrial sewer systems. From a human diet standpoint it is highly desirable to achieve a high degree of gelatinization in a corn product so as to improve the digestibility of the product. There is a direct correlation between the high gelatinization and high digestibility of food products containing a large constituent of cereal.

It is well understood that cooking is the physiochemical process that makes food ingredients suitable to enzymatic digestion by the metabolism of the human or animal body as the case may be. On a more refined level, cooking may be viewed as the science of preparing food for the table by heating it to achieve the desired change in flavor, texture, appearance or underlying chemical composition, all to facilitate digestion by humans or animals.

Cooking extrusion is a known process wherein moistened ingredients, most usually a starch or proteinacious materials, are forced to flow under a variety of conditions of mixing, heating and shearing through a specially designed opening so as to expand or to form a cooked material. Upon completion of the cooking extrusion process, the product may be in either the fully cooked or semi-cooked form. Further processing of the latter results in edible products. Thus, cooking extrusion can be viewed as either an intermediate stage in the preparation of food products or as a complete process for taking a starting food material and converting it into an edible product.

Commonly in the preparation of snack food products the final cooking step is to immerse the product in a suitable frying oil for about 0.5 to 3 minutes, the oil being at a temperature from about 175°–225° C. The oil content of the resulting snack food product, for example corn chips, is on the order of 35–38%. The American Heart Association teaches that a lower oil content in one's diet is a generally healthier human diet. Lower oil content in a product is valuable to the producer because it results in a lower cost of oil by requiring less make-up oil in the oil frying/cooking step.

The invention in summary relates to a process for preparing a food product, such as a snack food product starting from a cereal material such as whole kernel corn, wheat, rice, etc. A quantity of the dry cereal is taken as a starting material and is rehydrated in plain water to obtain a moisture content in the material of at least 20%. Water is drained from the material which is mixed to achieve some mechanical breakage of the kernel walls and even the distribution of water over the surface of the material. The material is transferred to a low shear cooking extruder to achieve substantial gelatinization of the material on the order of 75–80% or more by subjecting the material to low shear extrusion forces in the presence of heat. The particle size of the material is reduced in a conditioning action such as mixing and aeration and moisture content may be further reduced by ventilation or partial vacuum drawn over the material which is then formed by extrusion into a preselected shape and thereafter further cooked.

An important object of the invention is to provide an improved process to create a whole kernel cereal-based extruded snack.

Another object of the invention is to provide a process for making a snack food product which is finished cooked in suitable frying oil and which has a substantially lower fat content, e.g. 30%, as compared to traditionally fried corn products.

Another object is to provide a process for forming a cereal-based snack wherein the starting material is unmilled whole kernels, and usually of a lower grade than presently used.

Yet another object is to provide a process for preparing a whole kernel corn-based snack product wherein the need to use lime [calcium oxide or calcium hydroxide] for soaking is entirely eliminated.

A further object is to provide an improved process for forming an extruded food product from whole kernel cereal which retains the germ and bran constituents of the cereal thereby enhancing the process yield.

Another object of the invention is to provide an improved process for making a food product which is more energy efficient by comparison with other processes for making similar products.

These and other objects of the invention will appear from the following description in which one preferred embodiment is set forth in detail and diagrammatically illustrated in the accompanying drawings.

FIG. 1 of the drawings is a flow sheet illustrating the general method of carrying out our process for preparing a whole kernel corn-based extruded snack product; and FIG. 2 is a schematic representation of a system of apparatus which is useful in carrying out our process.

Generally stated, our new process for making whole kernel corn-based extruded snacks begins with the selection of the corn starting material. We have successfully used a No. 2 grade corn of the Dent type, as well as several hybrid varieties in the process. These corn types are substantially less expensive than the higher grade corn types in common use for making food products for human consumption. The whole kernel corn is placed in a soaking vessel with an ample quantity of water, say to cover the corn, leaving a sufficient head to allow for the proper rehydration of the kernel. The corn is left to soak for a period so that it may adequately rehydrate and the period may range from 2 to 16 hours.

To encourage more rapid moisture absorption of the whole kernel corn it is feasible to use hot tap water or to heat the mass of corn being soaked such as in a steam kettle or hot water jacketed vessel to achieve a more rapid hydration and thereby reduce the processing time.

The soaked or hydrated corn is strained to remove excess moisture and can then be processed directly by means of extrusion or placed in a mixing vessel equipped with paddles which cause some crushing, shearing and bruising of the corn kernels. In the mixing phase the opportunity is available for adding ingredients to the corn mix and to distribute the ingredients evenly in the corn material. A variety of different ingredients may be added to the corn so as to effect the taste, the texture or appearance desired in the finished product.

Following the mixing step, the corn material is subjected to a cooking extrusion step to achieve gelatinization. Gelatinization is the process of converting raw starch granules into partially soluble, functionally colloidal forms by treating the starch granules with heat in the presence of water. Cooking extrusion is viewed by workers in the field as generally either a high shear or low shear process step [Rossen, J. L. and Miller, R. C. 1973. Food Extrusion, Food Technol. 27[8]-46]. Commonly, high shear cooking extrusion takes place in a single step process where both cooking and forming occur in the same vessel. Within the vessel is a screw which rotates at from 250 to 500 rpm and serves both to convey the product from the inlet to the outlet, while applying a shearing force to the product wherein heat is generated that causes gelatinization and cooking of the raw materials. An outlet of the single step high shear vessel is equipped with a die or shaped orifice where forming or shaping of the product is achieved. Residence time in a high shear cooking extruder is on the order of from 15 seconds to 1 minute and a residence time of 30 seconds is common. In the high shear cooking extrusion process gelatinization is not uniform due, it is believed, to the low moisture requirement of the materials used. In high shear cooking processes it has been found that a dextrinization of the starch granules occurs which results in a product which is typified by the texture found in light or highly expanded snack food products, dry cereals, dry pet foods or textured plant protein. Further, high shear cooking extrusion is also characterized by restrictions on product moisture on the order of 4 to 17% and temperature ranges needed for the cooked material, some as high as 180° C. The restriction on pressures or temperatures as well as moisture content gives cooking that is less than desirable where the requirement is for a high percentage of gelatinization or uniform gelatinization in the product.

The low shear cooking extrusion process which we prefer is characterized by permitting a relatively higher product moisture content of between 15 and 40% and a relatively high residence time of the materials in the cooking extrusion phase. For example, on the order of between 1 and 4 minutes residence time and this results from the extension screw rotating in a range of 50 to 200 rpm. The result we have found from low shear cooking extrusion is a high percentage of gelatinization and uniformity of gelatinization with a lower incidence of dextrinization. The material worked upon may have a substantially higher moisture content than in the high shear process. Moisture content of whole kernel corn is desirable at about 28-30% moisture by weight. The higher temperature in the process and leads to more consistent cooking and uniformity of gelatinization. We have performed tests in our low shear, multi-stage extruder controlling the product temperatures among the several stages at 60° C., 70° C., 80° C. and found the product, upon further processing, to give a commercially acceptable corn chip. Further, using the same equipment we have controlled stage temperatures to 80° C. first stage, 100° C. second stage, 110° C. third stage, and 120° C. fourth stage to produce a very high quality and acceptable corn chip product.

Another characteristic of our low shear cooking extrusion is that the product at exit from the low shear cooking vessel is a fragmented product unrestricted by an exit aperture or die. That is, the product is unimpeded at the discharge end of the low shear cooking extrusion section, and is desirably fragmented for use in subsequent conditioning and forming operations.

A 75%-80% range of gelatinization of the whole corn product via the glucoamylase gelatinization test method, from the whole kernel corn processed in the low shear cooking extruder, is highly desirable.

Following the cooking extrusion step, the material is conditioned to aerate the product such as by subjecting it to ventilation fans, air withdrawal such as vacuum, so as to realize a moisture reduction within the product on the order of 3-4% further moisture reduction. The mixing action imparted to the product in the conditioning vessel serves to prepare it for the forming extrusion step to follow.

The corn material is received from the conditioning vessel into the forming extruder in particulate form with particle sizes on the order of 5-10 mm. The material is moved towards a shaped aperture and urged therethrough by a screw. No cooking and little shear effect is imparted to the corn material during the forming step save for the urging of the material through the die face. Any cooking which occurs at this instance is almost negligible. The apertures of the forming die can be of a variety of shapes including slots, grids, wheels, rings, etc. The slot-type die can be used efficiently to form a corn chip product directly, the chip then being immediately cut to an appropriate length after exit through the die and then fried in oil or being cooked in heated air. The other mentioned shapes are also cut at the die and are subjected to drying steps wherein the moisture content is reduced to between 8-12%.

The formed materials known in the field as "pellets" are given finishing treatments including toasting in an oven or frying in oil to expand the product into the finished edible item. The pellets may be seasoned and thereafter weighed into portion sizes and packaged for retail sales.

If desired, seasonings, vitamins, sweeteners, colorings, etc. may be applied during the conditioning step and these may include flavorings in liquid or powder form.

Referring to the invention in more detail and with reference to the drawings, FIG. 1 represents the general flow sheet of our new process for preparing a cereal-based food product, which process is continuous following the initial dwell in the water soaking step. FIG. 1 particularly illustrates the main steps of the entire process in sequence. Step 1 generally designates the selection of a quantity of whole kernel corn which may consist of a field grade of corn such as the Dent type and other hybrids. The starting material selected in this process, whole kernel yellow Dent corn, is substantially lower in cost because of the complete elimination of the milling operation typical for starting materials used in many of the other corn product processes. Moreover, working with the whole kernel corn directly in the process enables the constituent bran and germ portions of the corn kernel to be retained in the ultimate product and it is believed that the fat and protein constituents of the bran and germ assist in certain of the process steps detailed below. It is believed that the retention of the bran and germ components of the kernel enables the product to flow more smoothly in the cooking extrusion step of the process, to be detailed below. In the human diet, it is recognized that increase in bran content has shown a decrease in the incidence of colon cancer.

In Step 2, FIG. 1, the whole kernel corn, or other cereal such as rice or wheat, is soaked in water. Initially the starting raw material has a moisture content in the 13-18% moisture range. The material is placed in a soaking vessel with an ample quantity of water at room temperature and is left to soak for a period of from 2-16 hours. The Dent type was found to rehydrate best when left to soak for a period of between 7-10 hours. It was found that corn soaked for in excess of 16 hours absorbed too large a quantity of water for efficient use of the subsequent process steps. The most desirable moisture content of the soaked whole kernel corn for the purposes of this process is in the range between 28-31% moisture. The absorption of moisture by the corn is almost entirely a factor of soaking time allied with the degree of hardness of the endosperm of the corn kernel, which has been recognized to vary from crop to crop, season to season. Thus the moisture content is, in the setting of our processing plant, time dependent on the duration of the soak and this can be monitored in various ways well known in the field such as periodic sampling, moisture probes and so forth.

Our process is an improvement over existing corn processes because there is no need to use lime in the soaking process for encouraging moisture penetration of the kernel endosperm. Lime has the undesirable result in the ecological sense of requiring an expensive clean-up treatment before dumping the lime water into the municipal sewer mains. Lime (calcium oxide or calcium hydroxide) when eliminated from the process achieves substantial savings both in the sense of a lower process cost because of the absence of lime and because of the elimination of the water clean-up requirement.

In step 3 the soaked corn is strained to remove excess moisture. The water can be drained from the soaking vessel directly into the mains of the sewer system because of the absence of lime or other contaminants from the soak water.

Step 4 is the mixing phase of the process where the cereal material is conveyed to a mixing vessel equipped with paddles arrayed on a horizontal shaft. Time in the mixing vessel is in the range of from 1-15 minutes.

During the mixing phase, the soaked or hydrated corn product is set into motion as a part of a conveying step leading to the subsequent step of cooking extrusion to achieve gelatinization. Thus the corn delivered to the mixing vessel, is set into motion and is impacted by the paddles which not only move the corn laterally towards an exit opening, but raise the kernels, leaving them to fall by gravity and also to impact the kernels causing some crushing, shearing and bruising of the sidewalls of the corn kernels. We believe that the amount of kernels so physically effected by the paddles is on the order of 5%-10% which are cut, crushed, or otherwise physically affected by the mixing paddles. The abrasion to the wall of the kernels permits further moisture absorption into the cereal if so desired. Thus it is possible to increase the moisture content of the mix as indicated by substep 4(a). Another important factor in the mixing phase is the opportunity for adding ingredients to the mix as we have mentioned water as one ingredient in Step 4(a). Such ingredients may include white or yellow corn flour, corn starch of either the regular or waxy or modified types, or sodium chloride or flavorings may be added to the mix. Lime may be added in small quantities to realize the taste associated with a corn product.

We recognize that in the mixing step the moving kernels serve to carry on their surfaces flour or starch particles or salt particles as the case may be into the subsequent steps of the process. The uniformity of ingredients present in the corn mix is important in the mixing steps which is used to achieve a uniformity of the added ingredients throughout the material in the process.

In Step 5, the cereal material is subjected to a low shear cooking extrusion as we have characterized above. A highly efficient low shear extruder for purposes of this invention is the Mapimpianti Model G machine available in the U.S.A. from Mapam, Inc., 1913 Olde Homestead Road, Lancaster, PA 17601. This equipment includes a highly efficient mixer for achieving the results described above in Steps 4 and 4(a). The moisture content of the mix as delivered to the cooking extruder vessel has ranged from 25.6% to 33.2% but most often between 28% and 31% moisture. The cooking temperature profiles used in the cooking extruders 4 stage barrel, have been between 40° C. and 140° C.. The mean degree of gelatinization of whole kernel corn products in this process was found to be 80.2% with a temperature profile through the 4 stage barrel of 80° C., 100° C., 110° C. and 120° C. A conventional corn masa following cooking was found to have only 48.7% gelatinization. In determination of the degree of gelatinization we used a quantitative glucoamylase starch digestion method. [Chiang and Johnson, measurement of total gelatinized starch by glucoamylase and o-toluidine reagent. *Cereal Chemistry* 54 (3): 429-435; 1976.]

In Step 6, the substantially cooked corn or other cereal is delivered into a conditioning/mixing vessel. In the conditioning vessel a vacuum and/or ventilation or aeration can be used to extract moisture on the order of 2 to 5% from the cooked material and to cool it by as much as 40° C. The particle size of the cooked material is on the order of 5-10 mm and very few if any clumps or large balls of cooked product are present. The mixing paddles and the conditioning vessel lift and aerate the cooked product and convey it laterally towards the exit of the vessel for subsequent processing steps.

Flavorings or other additives may be added to the cooked mix as in Step 6A, FIG. 1, so as to achieve the desired taste profile.

In Step 7, the cooked corn material is received from the conditioning vessel in particulate form. The material is moved by a screw towards an aperture or die of a selected shape. The highly effected extruder former for the purposes of this invention is the Mapimpianti Model F available in the U.S.A. from the source mentioned above. This piece of equipment includes a highly effective conditioning vessel for achieving the results and purposes described above in connection with Step 6.

In the forming extrusion step the apertures of the dies can be a variety of shapes including slots, grids, wheels, or rings, etc. The slot-type die can be used efficiently for forming corn chip products directly, the chip then being immediately fried after exiting through the die and being cut into the appropriate chip length. The other shapes mentioned are also cut in the die and are subjected to drying or other steps as indicated at 7A. The moisture content from the drying step is reduced in the product to between 8–12%. Equipment to achieve the drying process are continuous dryers such as the Mapimpianti Model CD, wherein residence time, humidity and temperature are all regulated so as to achieve a product having the desired ultimate moisture content. Products of these materials are known in the field as "pellets", albeit the shapes are rings, wheels, grids, screws, ribbons, etc.

In Step 7A laminating or sheeting treatment is applied to the product. When the product exits the forming extrusion die in ribbon form it may have the thickness of as much as 1.5–4.0 mm with a width up to 100 cm. The laminator equipment receives this ribbon of highly gelatinized corn material which is carried through sets of from 1 to 3 pinch rollers where the product is reduced in cross-section to a thickness of about 1 mm. In this condition, the corn product is in ribbon form and the width up to 100 cm. The ribbon is then treated to a cutting action to form the desired snack food shapes. The moisture content of the product at entry into the laminating step is about 23%–27%.

Alternatively the cooked corn material can receive sheeting treatment directly following conditioning Step 6, as when making tortillas directly or preliminary to forming taco shells.

In Step 8 the cereal product is finished cooked such as by treating the pellets to toasting in an oven or to frying in a vat of cooking oil, or both, to expand the product into a finished edible item. A surprising result was observed from products formed from the above process in that we saw they had a significantly lower oil pick-up from the deep fat fryer than products made in the industry today, also using deep fat cooking. More specifically, a standard oil content of corn chips produced presently is on the order of 35–38%. Chips made by our process have been found to contain oil from 27–31% with a mean of 29.8%. We cooked chips in oil at 204° C. for 40 seconds. The chip was partially gelatinized in the cooking extruder, Step 5, with a temperature profile of 80° C., 100° C., 110° C., 120° C. for the 4 extrusion stages. Lower oil content is valuable to the producer and to the consumer for the reasons mentioned above including lower product cost and lower oil content in the human diet. The higher product yield is valuable to the producer resulting from utilization of all components of the whole kernel including the germ and bran.

Typical frying times in the above process are between 35–60 seconds in contrast to conventional frying times of products made with prior art processes of 90 seconds. The frying temperatures are essentially the same in ours and in the prior art processes. We believe that an energy savings of between 15–30% may be realized by using our new process over conventional processes in use today in the corn chip industry.

In Step 9 the fully cooked product is finished flavored, usually by salting or savory flavoring. The product may also be inspected by workers to ensure that it is of a high quality and to remove if necessary any unusual shaped or unusual looking pieces. The product is then conveyed to the weighing and packaging facility, Step 10, to be placed into packages of predetermined sizes for shipment to the marketplace as a snack food product.

As a first example, a quantity of whole kernel, No. 2 yellow Dent corn was soaked in water for 8½ hours, the water being at room temperature on the order of 15° C. The corn was then strained to remove excess water and because there was no lime in the soak water it was practical to drain the soaking water directly into the municipal sewer system. After soaking the corn had a moisture content of about 28%. The batch of soaked whole kernel corn was conveyed to a mixer where dry calcium oxide (CaO) was added to the extent of about 0.1% (one tenth of one percent) of the dry weight of the whole kernel corn. The rehydrated and mixed whole kernel corn had a moisture content of about 28%. During the mixing phase from between 5–10% of the kernels were broken up in the mixer. The paddles of the mixer conveyed the hydrated corn to a feed screw which transported the material into the low shear, cooking extruder where the corn mix was ground and cooked. The unit was a four stage cooking extruder with the screw rotating at 55 rpm, Mapimpianti Model G. The barrel temperatures per stage were, first stage: 80° C.; second stage: 100° C.; third stage: 110° C.; fourth stage: 120° C. The barrel was 1 meter in length and the screw was 55 mm in diameter. The residence time of the material was about 100 seconds. Upon exiting the fourth stage of the cooking extruder, the product was mixed and cut by blades located at the end of the extrusion screw and conveyed to a second mixing vessel where the product was ventilated to extract moisture from the cooked materials and to cool it. The cooked corn was then conveyed to a forming extruder where the material was pressed through a die to form a corn chip, the chip being cut directly at the face of the die. A quantity of corn chips were fried directly in a body of vegetable oil for 45 seconds at 204° C. The oil pick-up in the chip was about 29.8%, which contrasts with the 34–38% oil content of corn chips well accepted in the marketplace. The corn chips produced in our new process had an excellent texture and flavor and the proper color and appearance of the commercially popular corn chips in the marketplace today.

For a second example, a quantity of whole kernel, No. 2 yellow Dent corn was soaked in water and then carried through steps 3–7 of FIG. 1 as described above in connection with example 1. The corn chip formed at the die in this example 2 was thereafter further treated, step 7A, by passing the chip through a 7 pass shaker pre-dryer where the moisture content in the formed chip was lowered an additional 1–5%. Thereafter the chip was finished fried in a vegetable oil for 40 seconds at 190.5° C. The resulting product had an excellent appearance and taste and met the standard of a high quality commercial grade corn chip.

As a third example, a quantity of whole kernel, No. 2 yellow Dent corn was treated by soaking in water and straining off the unabsorbed water and placed in a mixer as described above for example 1. Based on weight of the dry whole kernel corn, there was added to the soaked corn 10% yellow corn flour and 5% regular corn starch during the mixing phase as illustrated in the drawing at step 4A. During treatment in the low shear cooking extruder the barrel temperatures per stage were, first stage: 80° C.; second stage: 90° C.; third stage: 115° C.; fourth stage: 130° C. The residence time of the material in the extrusion vessel was about 90 seconds. Thereafter the material was subjected to the conditioning step 6 and the forming extrusion step 7. The mix was extruded through a die to give a "wheel"

configuration and this shape was conveyed through a shaker pre-dryer to remove a further 1–5% moisture and was thereafter dried in a second dryer unit to have a final moisture content of between 8–16%. We have determined, however, that an ideal moisture content in making a corn pellet by this process is the range between 9.5% and 11.5%. We then expanded the product in a hot air oven for finish cooking.

As a fourth example, a quantity of whole kernel No. 2 yellow Dent corn was treated as in example 1 above to steps Nos. 2–6, FIG. 1, as described above in example 1. The cooked corn material was passed through a die in the forming extrusion step issuing at a strip which was conveyed to a laminating roller and compressed to between 0.65 mm and 1.3 mm in thickness. This step is known in the field as sheeting or laminating or compressing. The laminated material was then conveyed to a shearing roller and formed into strips of a selected width and thereafter cut to a selected length by a cutting roller, step 7A, FIG. 1. The product was then finished fried in vegetable oil, heated to 204° C. for 35 seconds. This product had excellent taste, bite and appearance characteristics. Another treatment which may be given to the formed corn strip after it issues from the forming extrusion die is to further form the chip in a closed mold to either a single curved shape or a compound curve shape resembling a saddle shape, e.g. curved along two perpendicular axes. Products of this shape are commonly found today in formed potato chips on the market.

In a fifth example, we used a quantity of whole kernel, soft red winter wheat. The wheat kernels were soaked in water at room temperature for about 6 hours and achieved a moisture content of about 28.5%. Following a mixing step substantially as described above, the soaked whole kernel wheat was treated to low shear cooking extrusion in a four stage barrel apparatus mentioned above where the temperature profile per stage was, 80° C., 100° C., 110° C., and 120° C. Residence time was about 120 seconds. Following the conditioning step the wheat material was passed through a forming extruder equipped with a die to produce a strip which was conveyed to a laminating series of pinch rolls and then conveyed to a stamping machine and formed into a cracker shape. As thus formed, the product was fried in vegetable oil heated to 193° C. for 30 seconds. A second batch was finished cooked by toasting in a hot air oven heated to 280° C. for 30 seconds. The fried product was dark in color but had a uniform and acceptable texture. The toasted product was also acceptable and had a crisp texture and a bland flavor.

A sixth example involved using a quantity of whole kernel brown rice to produce a rice cracker product. It was found that the rice material absorbed moisture quite readily and it was possible to extrude the material without prolonged soaking. The rice material was hydrated in the mixing step, 4 with the addition of water in step 4A, prior to low shear cooking extrusion. In the four stage cooking extrusion unit mentioned above the temperature profiles were per stage, 50° C., 60° C., 70° C., 80° C. Residence time was about 100 seconds. Formulations used were 100% rice as well as 90% whole kernel rice and 10% hard wheat flour. During processing both products were dried to an 8–10% moisture content. The finished cracker after issuing from the forming extruder, was toasted for between 30–45 seconds in a hot air oven heated in the range 277°–282° C. The rice cracker thus formed had a good crisp texture and was somewhat gritty. The addition of the wheat flour, we believe, permitted more uniform flow of the product through the forming extruder and produced in the rice chip a darker color.

For a seventh example, we formed a rice cake product starting with a quantity of whole kernel rice and processed in the mixing and hydration steps mentioned above and then treated with low shear cooking extrusion in the four stage barrel cooking extruder with a temperature profile per stage of 80° C., 100° C., 120° C., 130° C. Residence time was about 100 seconds. A special slot die was arranged on the cooking extruder so that the product would extrude in a strip which was cut, the product dried to a low moisture content and toasted at about 280° C. for about 45 seconds. The resulting product had the character of a commercially acceptable rice cake product and was somewhat gritty.

Mixtures of whole kernel cereal can be used to produce products as outlined in the above examples. FIG. 2 schematically illustrates apparatus for carrying out our process for preparing snack food products from whole grain cereal starting materials. As previously indicated, the processing is initiated by selecting a quantity of the whole kernel starting material and depositing the material in a vessel 21 with a sufficient quantity of water to rehydrate the dry starting material. The soaking vessel 21 may be equipped with a drainpipe 22 which empties into a municipal sewer system being that the soak water is substantially free of contaminants such as lime conventionally used in corn processing. The vessel 21 may be equipped with a hot water or steam jacketing (not shown) for accelerating the hydration by soaking at a higher temperature.

A mixing vessel 23 is equipped with an array of paddles 24 mounted on a horizontal shaft 26 and configurated to urge the product in the direction of the arrow 27 towards the outlet of the mixer which is operatively coupled to a feed screw 28 which delivers the process materials to a low shear cooking extruder 29. The mixing vessel 23 is equipped with suitable ports for water injection, if needed, or for injection of powder form ingredients such as flour, salt, lime or the like.

The cooking extrusion vessel 29 is a four stage configuration in which each stage has a separate temperature control system so that a temperature profile may be established axially along the barrel of the extruder through which the material is pressed to achieve the desired extrusion cooking objective. The basic definition of our cooking screw is a multicompression, multiflighted screw consisting of four separate sections. Within each section, screw root diameter increases. Flight width and channel width remain constant with a minor exception at the discharge end where both the flight and channel widths are significantly reduced. The compression ratio is on the order of about 3 to 1.

At the end of the cooking screw the barrel is equipped with an extrusion head with a peripheral die and a special fixed speed cutting device for shredding or chopping the cooked, extruded material into small pieces of no particular or definite shape, the pieces being delivered to the conditioning vessel 31.

The Mapimpianti G Cooking Extruder, mentioned above, includes a mixing vessel and feed screw in its components. A three stage low shear cooking extrusion unit is also useful for practicing our process and the cooking profile can be adapted from the values given above. The cooking extrusion unit 29 may have 3 or 4 or more cooking stages as output requirements and other design criteria may dictate.

The material following cooking extrusion is delivered from the extrusion vessel 25 to a conditioning mixer vessel 31 equipped with paddles 32 mounted upon a horizontal shaft 33. The conditioning vessel and forming extruder can be a Mapimpianti F combination unit. From the conditioning vessel 31 the cereal material is delivered to the forming extrusion vessel 34 equipped with a suitable die (not shown) for producing the desired shape at the die face. Depending upon the shape desired, the cereal material may be further shaped as by laminating or cutting and transferred then to a unit for further cooking or may proceed directly from the die face to a cooking medium contained within the apparatus 36. As mentioned above, the cooking medium may be hot vegetable oil or a hot air atmosphere found in a cooking oven.

Alternatively, in the case of corn pellets the product after shaping is transferred to a predryer, i.e., a Mapimpianti TM, for a short period of time to reduce the moisture content in some measure and then to a continuous dryer, i.e. Mapimpianti Model CD, for a time period from between 4-12 hours to further reduce the moisture content of the pellets to on the order of 10-12%. Pellets may be finished cooked in vegetable oil or hot air, depending upon the product specifications.

In the case of products that are finish cooked and directed towards the marketplace, flavoring is applied at a flavoring station 37 after which the finished products are transferred to a weighing and a packaging facility 38 where quantities of the product are placed in bags or packets of a preselected weight which are themselves boxed and transported as a finished product to retailers or the like.

Many variations are possible in the processes described here and in the use of the exemplary apparatus disclosed.

For example, while the combination apparatus of cooking extruder and mixing vessel has been described as one apparatus highly useful in carrying out our process, it is contemplated that separate and independent mixing and cooking extrusion units may as well be used should it be desired. It may be desirable in some instances to carry out the final cooking of the products in two or more heat treatment stages. Accordingly, it should be understood that the disclosures herein are intended to be truly illustrative and not in any sense limiting.

What is claimed is:

1. A process for preparing a food product from a cereal starting material, the steps comprising: providing a quantity of dry cereal starting material in the unmilled, whole kernel state, hydrating the starting material to a moisture content at least greater than 15% moisture, draining the unabsorbed water from the cereal material, subjecting the material to low shear extrusion cooking for a time and with sufficient heat to gelatinize to about 75% the starch constituent of the material, reducing the moisture content of the extruded material through aeration in a conditioning step, extrusion forming the material to a pre-selected shape, and further cooking the material.

2. The process of claim 1 wherein the starting material is hydrated to achieve a moisture content of between 20 to 30%.

3. The process of claim 1 wherein, preceeding the low shear extrusion cooking, the whole kernel cereal material is mixed to achieve mechanical breakage of the outer kernel wall.

4. The process of claim 3 wherein further ingredients are supplied to the cereal materials during the mixing step, such materials being from the group consisting of white corn flour, yellow corn flour, corn starch, flavorings, lime or water.

5. The process of claim 3 wherein the whole kernel cereal material is from the group consisting of corn, wheat and rice.

6. The process of claim 1 wherein the material is subjected in the low shear cooking extrusion step to temperature gradients of between 40° C. to 140° C., and thereafter the material is substantially cooled by as much as 40° C.

7. A process for preparing a corn-based, snack food product, the steps comprising: providing a quantity of whole kernel corn as a starting material, soaking the corn kernels in water to achieve a corn moisture content in the range from about 20% to about 40% moisture, separating the corn kernels from the soak water, mixing the corn kernels for a period of time sufficient to distribute surface water substantially evenly and to abraid the kernels, applying low shear cooking extrusion forces to the kernels for a time and temperature sufficient to gelatinize about 80% of the starch constituents of the corn kernels, conditioning the extruded material under conditions sufficient to reduce the moisture content within the material on the order of about 4% and pressing the material through a die into a preselected shape, and then further cooking the material.

8. The process of claim 7 wherein during the cooking extrusion step a temperature profile is maintained over a plurality of cooking stages beginning at about 80° C. and progressively increasing to a final cooking temperature of about 130° C.

9. The process of claim 8 wherein following the forming extrusion step the material is laminated then cut, and thereafter cooked in a vat of cooking oil.

10. The process of claim 8 wherein the processed material has a residence time in the low shear cooking extrusion step of between 1 and 4 minutes.

11. A process of preparing a corn-based product, the steps comprising: providing a quantity of whole kernel corn as a starting material, soaking the corn kernels in water to achieve a moisture content of substantially 30%, draining the soak water from the corn kernels and discharging the water directly into the sewer system without substantial water treatment, mixing the corn kernels for a period of time sufficient to distribute surface water substantially evenly and then treating the material to low shear cooking extrusion for a time between 1 and 4 minutes at temperatures of between 80° C. and 140° C. to gelatinize substantially 80% of the starch constituents of the corn kernels, and thereafter cooling the material, converting the material into pieces with a nominal piece size on the order of between 5 to 10 mm, forming the material into a sheet and cutting the sheet material.

* * * * *